United States Patent [19]
Mulder et al.

[11] 3,821,266
[45] June 28, 1974

[54] PROCESS FOR THE PREPARATION OF THIOHYDROXIMIC ESTERS

[75] Inventors: Albertus J. Mulder; Robert Van Helden, both of Amsterdam, Netherlands

[73] Assignee: Shell Oil Company, New York, N.Y.

[22] Filed: July 3, 1972

[21] Appl. No.: 268,373

[52] U.S. Cl. .............................. 260/453 R, 252/455
[51] Int. Cl. ................... C07c 119/18, C07c 119/20
[58] Field of Search ............................... 260/453 R

[56] References Cited
UNITED STATES PATENTS

| | | | |
|---|---|---|---|
| 2,786,865 | 3/1957 | Copenhaver | 260/453 R |
| 3,441,500 | 4/1969 | Wunderlich | 208/213 |
| 3,462,471 | 8/1969 | Gruber et al. | 260/453 R |
| 3,535,361 | 10/1970 | Anders et al. | 260/453 R |
| 3,658,869 | 4/1972 | Soloway et al. | 260/453 R |

OTHER PUBLICATIONS

Zul'Fugarova et al., "Prep. of Catalyst for the Polymers of Ethylene" (1970), Ca 73, No. 99380 r., (1970).

*Primary Examiner*—Glennon H. Hollrah

[57] ABSTRACT

Thiohydroximic esters of the formula

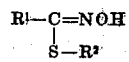

wherein $R^1$ and $R^2$ are individually an optionally substituted hydrocarbyl group and $R^1$ may also be hydrogen, are prepared by reacting a nitro compound $R^1$-$CH_2NO_2$ with a thiol $R^2SH$ in the presence of a solid non-acid gamma-alumina containing catalyst.

7 Claims, No Drawings

PROCESS FOR THE PREPARATION OF THIOHYDROXIMIC ESTERS

BACKGROUND OF THE INVENTION

1. Field of the Invention.

This invention relates to an improved process for the preparation of thiohydroximic esters. The invention also relates to a method for the isomerization of the stereoisomers of the said thiohydroximic esters.

2. Description of the Prior Art.

Various methods for the preparation of thiohydroximic esters are known in the art. U.S. Pat. No. 3,658,869 discloses a two-step preparation of thiohydroximic esters by chlorination of an aldoxime in aqueous medium followed by reaction of the resultant chloroacetaldoxime with a thiol. This process is commercially unattractive because of the high cost of the oxime starting material.

An alternative one-step process for the preparation of thiohydroximic esters is disclosed in U.S. Pat. No. 2,786,865. In this process, the expensive oxime is replaced by a cheaper starting material, a primary nitroalkane, which is reacted with the appropriate thiol in a basic medium, for example, in the presence of a sodium alcoholate in a homogeneous environment. Unfortunately, the yield of thiohydroximic esters obtained by this process is quite low.

SUMMARY OF THE INVENTION

Surprisingly, we have now found that the preparation of thiohydroximic esters can be carried out in a one-step process with excellent yield when the reaction of the primary nitro compound and the thiol is brought about in the presence of a gamma-alumina catalyst.

This process produces mixtures of stereoisomers of the thiohydroximic esters. Since the syn-isomer is preferred as an intermediate in the preparation of biologically active compounds, it is desirable to have a method available for the conversion of the anti-isomers into the syn-isomer form. It has now been found that this conversion can be accomplished in a simple way by treatment with a hydrogen halide.

DESCRIPTION OF THE PREFERRED EMBODIMENTS

A process has been found for the preparation of thiohydroximic esters of the general formula

wherein $R^1$ and $R^2$ each individually represents a substituted or unsubstituted alkyl, aryl or aralkyl group and $R^1$ may also represent a hydrogen atom, in which process a nitro compound, $R^1$-$CH_2NO_2$ is contacted with a thiol, $R^2SH$, in the presence of a solid, non-acid gamma-alumina containing catalyst.

In general, suitable nitro compounds, $R^1$-$CH_2NO_2$ are primary alkyl, aryl or aralkyl compounds, which if desired, may contain one or more substituents, and of which the number of carbon atoms is preferably not larger than 10 and in particular not larger than seven. The symbol $R^1$ may for instance, represent a hydrogen atom or a substituted or non-substituted alkyl, cycloalkyl, phenyl or phenylalkyl group. Typical nitro compounds are for instance: nitromethane, nitroethane, 1-nitropropane, 1,4-dinitrobutane, 2-nitroethanol, (nitromethyl)benzene and (2-nitroethyl)benzene. Preference is given to nitro compounds in which $R^1$ represents a H-atom or a methyl or ethyl group. The most preferred compound is nitroethane.

The thiol, $R^2SH$, which is caused to react with the nitro compound, an usually be either an alkyl, aryl or aralkyl thiol. The substituted or nonsubstituted group $R^2$ may for instance represent an alkyl, cycloalkyl, aralkyl or aryl group, which groups preferably have not more than 10 carbon atoms. Very suitable thiols are for instance: methanethiol, ethanethiol, 1-octanethiol, cyclohexanethiol and benezenethiol; substituted thiols, such as 2-mercaptoethanol ($R^2$=$CH_2$-$CH_2$-OH) and 3-mercaptopropiononitrile ($R^2$=$CH_2$-$CH_2$-CN); and polyfunctional thiols, such as 1,2-ethanedithiol ($R^2$=$CH_2$-$CH_2$-SH). Very good results are obtained with aliphatic thiols, in particular with methanethiol, $CH_3SH$. Of the substituted thiols in general cyanoalkylthiols are preferred which have two to six carbon atoms, in particular ω-cyanoalkylthiols with an unbranched alkyl group, such as 4-mercaptobutyronitrile, and particularly 3-mercaptopropiononitrile.

The relative quantities of the primary nitro compound and the thiol, which may vary between wide limits, lie preferably between the stoichiometric quantity and an excess of the nitro compound. It has been found that the desired conversion proceeds considerably faster and is moreover more selective when an excess of the nitro compound is used. Advantageously, use is made of 1.2 to 4.5 gram equivalents, in particular of 1.5 to 2.5 gram equivalents of the nitro compound, per gram equivalent of the thiol.

The process according to the invention can be carried out in the presence or absence of a solvent. It has been found that polar solvents, such as dioxane, 1,2-dimethoxyethane, methanol and ethanol, usually have a beneficial effect on the reaction rate and often on the selectivity as well. Of these compounds in general dioxane and 1,2-dimethoxyethane are preferred. In many cases, on the other hand, an apolar solvent can advantageously be selected, particularly toluene or xylene, in order to facilitate the working-up of the reaction mixture. Thus, for instance, in the preparation of the S-(2-cyanoethyl) ester of thioacetohydroximic acid from nitroethane and 3-mercaptopropiononitrile, using toluene, the syn-form, which is an important starting material for the preparation of biologically active products, is obtained directly in an almost pure form by crystallization. It is often more attractive, however, to cause the reaction to take place in the absence of one or more of the said polar or apolar solvents. This holds true particularly when according to a preferred embodiment an excess of the nitro compound with respect to the thiol is used. It has proved particularly advantageous to use the nitro compound employed in excess as the solvent. Only in the working-up procedure is it as a rule useful to add a suitable solvent, such as toluene or xylene, to the reaction mixture obtained.

An attractive concentration of the thiol in the reaction mixture lies for instance between 0.5 and 8 gram equivalents per litre. The reaction rate usually increases with increasing thiol concentration. Preference is given to 1.2 to 4.5 gram equivalents per litre of reaction mixture.

According to the invention a non-acid gamma-alumina is used as the catalyst. Suitable gamma-aluminas are for instance those with a specific surface area of 50 to 400 m²/g, in particular 200 to 400 m²/g, and a pore volume of for instance 0.3 to 1 ml/g, in particular 0.3 to 0.6 ml/g. Suitable gamma-aluminas are commercially available in various forms, for instance as nibs, granules or powders. Particularly goods results are obtained, for instance, with powders of 100 to 400 mesh, or granules with a diameter of 0.5 to 1.2 mm. Examples of suitable gamma-aluminas are: gamma-$Al_2O_3$ "A," "SAP 350" and "SCS 350" (Pechiney), gamma-$Al_2O_3$ "CK 300" and "CLA 25048" (Ketjen), gamma-$Al_2O_3$ "CLA 2690" (Peter Spence) and $Al_2O_3$ "pro analisi" (according to Brockman). Prior to use the catalysts were usually heated at 500°–600°C for some time.

Preferably, use is made of a gamma-alumina containing one or more non-acid alkali metal and/or alkaline earth metal compounds, which may be derived, for instance from Li, Na, K, Mg or Ca, such as the sulphates, oxides, hydroxides and/or aluminates thereof. Of these compounds basic compounds, in particular the oxides, hydroxides and aluminates, are particularly preferred. Very good results are obtained with alkali metal compounds. They have been found to increase the reaction rate considerably in the order Li<Na<K. Preeminently suitable are gamma-aluminas containing a basic potassium compound.

As usual, the metal compound content of a gamma-alumina is expressed in the following as oxide (oxides), without the compound(s) actually present being taken into account. Some commercial gamma-aluminas may already contain small amounts of metal compounds, for instance 0.16–16 mmole $Na_2O$ per 100 grams (0.01 – 1.0 percent w $Na_2O$). Although as a rule very good results are obtained with such gamma-aluminas, preference is given to larger quantities of the metal oxide, for instance of the order of 50–250 mmole per 100 grams, which cause the conversion to be accelerated considerably.

The said catalysts containing alkali metal oxides or alkaline earth metal oxides can be obtained in one or the usual ways, preferably by impregnation of a gamma-alumina with an aqueous solution of a suitable alkali metal coupound, such as a hydroxide or a carbonate. It is advantageous to use the calculated quantity of an aqueous solution corresponding to the pore volume. Subsequently the water can easily be removed by drying at elevated temperature, upon which the catalyst is heated for some time at 400°–600°C, preferably at 560°–580°C. Preference is given to the carbonate as the metal compound, in particular potassium carbonate.

The process according to the invention can be carried out batchwise or continuously. For example, the conversion is caused to take place in a stirred suspension of the finely ground catalyst in the reaction mixture. In the case of strongly exothermic reactions it is recommended that the catalyst be added gradually. What quantity of catalyst is required depends among other factors on its activity, on the starting materials used and on the reaction conditions. In general suitable quantities lie between 10 and 150 grams catalyst per gram equivalent of the thiol, in particular between 40 and 100 grams per gram equivalent. Smaller or larger quantities are not precluded, however. Good results are also obtained by passing the reaction mixture over a catalyst bed, for instance in a tubular reactor filled with catalyst granules. If necessary, part of the product stream can be recycled to attain the desired level of conversion.

Suitable reaction temperatures generally lie between 0° and 100°C. The working temperature preferably lies between 15° and 80°C, particularly between 40° and 60°C. The choice of the most advantageous temperature is determined among other factors by the reaction rate and the thermal stability of the reaction components concerned and the products formed. As a rule the reaction proceeds smoothly at atmospheric pressure.

If gaseous reaction components such as methanethiol are used, it is recommended, however, to apply elevated pressure, in order to keep the reaction mixture in the liquid state.

The thiohydroximic esters are usually formed as mixtures of stereoisomers, a syn-form and an anti-form:

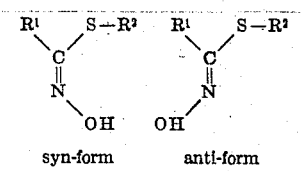

syn-form    anti-form

Since the syn-isomer is usually an important intermediate in the preparation of biologically active compounds, in particular of carbamoyl derivatives having pesticide properties, for instance according to the process described in the Dutch Pat. application no. 7008483, it is desirable to have a method available for the conversion of the anti-isomers to syn-isomers. Suprisingly it has now been found that this conversion can be realized in a simple way by treatment with a hydrogen halide. Preferably the anti-isomer, or a mixture of the two stereoisomers, is contacted with dry HCl, for instance in a suitable solvent, such as dioxane, 1,2-dimethoxyethane, xylene and/or toluene. Mixtures of polar and apolar solvents, particularly of dioxane or 1,2-dimethoxyethane and toluene, for instance in a volume ratio of approximately 1/1, have proved particularly suitable. Preferably the mixture is stirred for some time in the presence of HCl at a temperature of 0°–30°C, the syn-isomer usually crystallizing out as HCl salt, from which the syn-isomer can be obtained, for instance, by neutralization with $NaHCO_3$. It is advantageous to use a small excess of HCl, for instance in a solution of 10–20 percent w of HCl. If required, the treatment with HCl can subsequently be repeated with the remaining solution.

According to a preferred embodiment first the largest possible quantity of the syn-isomer is isolated from the isomer mixture formed in the reaction of the nitro compound and the thiol, which syn-isomer — for the case in which toluene is applied — crystallizes out upon removal of the remaining nitro compound. Subsequently, the product which has remained in solution, which mainly consists of the anti-isomer, is subjected to the treatment with HCl, which leads to isomerization of the anti-isomer. Since in certain cases the anti-isomer may be unstable, it is recommended to work up the reaction product as soon as possible.

The reverse isomerization, i.e., from syn-isomer to anti-isomer, is also possible. To achieve this conversion, a solution of the syn-isomer, or a mixture of the two isomers, is treated with a catalytic quantity of toluenesulphonic acid at room temperature.

The thiohydroximic esters obtained, such as the S-(2-cyanoethyl) ester and the S-methyl ester of thioacetohydroximic acid, in particular the syn-isomers thereof, can be converted to products with pesticidal properties by carbamoylation, for instance with $COCl_2$ and methylamine. Examples are the S-(2-cyanoethyl) ester of O-(N-methylcarbamoyl)-thioacetohydroximic acid and the corresponding S-methyl ester, which possess highly insecticidal and acaricidal activities.

EXAMPLE I

S-(2-cyanoethyl) ester of thioacetohydroximic acid

A reaction vessel provided with a heating jacket, suspension stirrer, thermocouple and a gas feed tube was charged with a mixture of 16.5 grams of 3-mercaptopropiononitrile (MPN), 60.4 grams technical nitroethane (NE) with a NE content of 94.9 percent w and 61.4 grams dioxane, while a small stream of nitrogen was passed through the mixture. The mixture was heated to 60°C, upon which 10 grams powdered gamma-alumina "SAP 350" (Pechiney) with a $Na_2O$ content of 0.7 percent w (=11.3 mmole/g) was added with vigorous stirring. The gamma-alumina used had a specific surface area of 360 m²/g and a pore volume of 0.4 ml/g and had previously been heated for 4 hours at 580°C.

Subsequently the reaction mixture was maintained in the $N_2$ atmosphere at about 50°C with stirring, the conversions of MPN and NE being followed by means of GLC analysis of samples of 0.5 ml (after removal of the catalyst by centrifugation), which samples were taken at regular intervals. From the conversions found the selectivity was calculated according to the formula: selectivity (mole of NE converted/mole of MPN converted) × 100. The experiment was discontinued after 96 percent MPN had been converted, which was after 15 hours. The selectivity was then almost 100 percent.

The results have been collected in Table A.

The reaction mixture thus obtained was filtered without having been cooled down and the catalyst filtered off was washed with three 25 ml portions of dioxane upon which the excess of NE and the solvent were distilled from the filtrate at 50°C under reduced pressure. At the same temperature the MPN still present was then removed by reduction of the pressure to 0.2 mm Hg. The oil obtained as a residue (26 g), which partly crystallized was an almost pure mixture of the syn-form and the anti-form of the S-(2-cyanoethyl)ester of thioacetohydroximic acid.

Recrystallization from 1,2-dichloroethane yielded, after filtration, 11 grams of the syn-isomer as white needles. From the filtrate 13 grams of the anti-isomer was obtained as light-yellow oil by extraction with pentane/toluene (equal parts by volume) and evaporation of the extract.

EXAMPLES II – XI

In Table A below, the data obtained in a number of similar experiments carried out under different conditions, have been collected together with the results of Example I. Further details are given below.

The experiments were discontinued after MPN conversions of about 90–95 percent had been reached. The calculated selectivities lay between 90 and 100 percent.

TABLE A

NE = nitroethane; MPN 3-mercaptopropiononitrile
$M_2O$ = alkali metal compound content of the gamma-alumina

| Example No. | NE/MPN mole/mole | $M_2O$ | $M_2O$, mmole/100 g | solvent | Temp., °C | Time, Hours |
|---|---|---|---|---|---|---|
| I | 4.0 | $Na_2O$ | 11.3 | dioxane | 60 | 15 |
| II | 1.1 | $Na_2O$ | 11.3 | dioxane | 60 | 48 |
| III | 4.0 | $Na_2O$ | 160 | dioxane | 60 | 4 |
| IV | 4.0 | $Li_2O$ | 170 | dioxane | 60 | 25 |
| V | 4.0 | $K_2O$ | 150 | dioxane | 60 | 1.5 |
| VI | 4.0 | $K_2O$ | 150* | dioxane | 60 | 4 |
| VII | 2.3 | $K_2O$ | 150 | toluene | 20–40 | 5 |
| VIII | 2.4 | $K_2O$ | 150 | toluene | 40 | 2 |
| IX | 1.8 | $K_2O$ | 150 | toluene | 32 | 6.5 |
| X | 1.7 | $K_2O$ | 150 | xylene | 40 | 4 |
| XI | 2.0 | $K_2O$ | 150 | no solvent used | 40 | 4 |

*The quantity of catalyst used was half of that used in Example V.

EXAMPLE XII

Using a procedure similar to that used in Example I, 43 grams MPB, 41 grams NE, 20 grams gamma-alumina and 65 grams dioxane were charged to the reaction vessel. After 48 hours, 90 percent MPN had been converted. A quantity of 53.5 grams product was obtained, from which after recrystallization from dichloromethane 28 grams syn-isomer and 22 grams anti-isomer were isolated.

A comparison with Example I illustrates the effect of a lower NE/MPN ratio on the reaction rate.

EXAMPLE XIII

Using a procedure similar to that used in Example II, 19.1 grams MPN, 66.9 grams NE, 75.2 grams dioxane and 12.8 grams gamma-alumina with an $Na_2O$ content of 10 percent w (160 mmole/100 g) were charged to the reaction vessel.

The catalyst was prepared by impregnation of gamma-$Al_2O_3$ "SCS 350" (Pechiney) with the calculated quantity of NaOH, dissolved in a quantity of water corresponding to the pore volume. The original gamma-$Al_2O_3$ had a specific surface area of 311 m²/g and a pore volume of 0.47 ml/g, and contained <0.042 percent w $Na_2O$ (<0.68 mmole/100 g). The NaOH solution and the catalyst were mixed with stirring, dried in vacuum at 200°C and heated at 560°–580°C for 3 hours. The mixture was then ground finely and the powder obtained heated for 17 hours at 580°C.

Already after 4 hours 95 percent of MPN had been converted. The reaction yielded 29.1 grams of a colorless oil from which, after recrystallization from toluene, 12.3 grams syn-isomer and 15.0 grams anti-isomer were obtained.

A comparison with Example I illustrates the beneficial effect on the reaction rate of a gamma-$Al_2O_3$ with a higher $Na_2O$ content.

EXAMPLE XIV

The reaction of Example XIII was run under identical conditions with the exception that a gamma $Al_2O_3$ containing $Li_2O$ was used, prepared by impregnation of the gamma $Al_2O_3$ with LiOH in a way analogous to that in Example XIII. After 25 hours 92 percent MPN had been converted. A yellow oil was obtained, from which 6.5 grams syn-isomer and 20 grams anti-isomer were isolated.

A comparison with Example III shows that with $Li_2O$ not only a much longer reaction time is required, but also that substantially greater quantities of the anti-isomer is formed.

EXAMPLE XV

The reaction of Example XIII was run under identical conditions with the exception that a gamma $Al_2O_3$ containing $K_2O$. In this case already after 1.5 hours 91 percent MPN had been converted. After termination of the reaction $CO_2$ was passed into the reaction mixture for 30 minutes. A product was obtained from which, after recrystallization from dichloromethane/toluene, 19.7 grams syn-isomer and 11.4 grams anti-isomer were obtained.

EXAMPLE XVI

The reaction of Example XV was duplicated using only 6.5 grams catalyst. After 4 hours 98 percent MPN had been converted. A product (30 grams) was obtained from which 15.4 grams syn-isomer and 14.2 grams anti-isomer were isolated.

This example illustrates the effect of a smaller quantity of catalyst — half of that used in Example XV — on the reaction rate.

EXAMPLE XVII

The reaction was carried out in a 1.5 litre reactor in way analogous to that of Example XV, but at a lower temperature than in the preceding Examples, and with toluene as the solvent. Also, in comparison with Example XV a lower NE/MPN ratio was used and the catalyst was gradually added to the reaction mixture.

To the mixture of 169 grams MPN, 345 grams NE and 480 grams toluene at 20°C, an amount of 84 grams of catalyst was gradually added, during which addition the temperature rose to 30°C in 15 minutes. The mixture was then heated to 40°C in 15 minutes and maintained at this temperature for 5 hours, after which 94 percent MPN and 42 percent NE has been converted.

After the catalyst had been filtered off and washed with 150 ml hot toluene, the filtrate was evaporated in vacuum at 40°C to one fourth of the original volume with the aid of a film evaporator. The syn-isomer which had crystallized out after cooling of the concentrate to 0°C was filtered off and washed with icy toluene/pentane and dried in vacuum at 40°C. In the same way, after the filtrate had been evaporated to one third of its volume, a second portion of the syn-isomer was obtained. A total amount of 143 grams syn-isomer was thus isolated. Evaporation of the filtrate at 40°C and 0.2 mm Hg yielded 116 grams anti-isomer (purity 95 percent). The total yield of syn- and anti-isomers calculated on MPN intake therefore amounted to 92 percent m.

Isomerization of Anti-Isomer to Syn-Isomer

A solution of 30 grams dry HCl in 300 ml dioxane was added dropwise in 20 minutes to a solution of the anti-isomer obtained in 200 ml toluene/dioxane (volume ratio 4:1) at 15°–20°C with stirring. After 1½ hours the granular precipitate formed was filtered off, washed with icy toluene and dried by suction. A quantity of 122 grams of the HCl salt of the syn-isomer was obtained as crystalline powder.

This HCl salt was subsequently added portionwise to a stirred mixture comprising 58 grams $NaHCO_3$ and 20 grams NaCl in 100 ml water, and 300 ml methyl ethyl ketone (MEK) at 20°C. After the $CO_2$ generation had ceased, a pH of 7.5 had been reached. The organic upper layer was now separated off, the lower layer washed with a small quantity of MEK and and the combined MEK solutions dried over $Na_2SO_4$ and evaporated under vacuum at 40°C upon which the residue was recrystallized from toluene. A quantity of 83 grams syn-isomer was obtained.

From the filtrate resulting from the separation of the HCl salt another 9 grams of the syn-isomer was obtained by analogous treatment with a mixture of NaCl in water, MEK and a small quantity of $NaHCO_3$.

The total yield of syn-isomer calculated on MPN intake therefore amounted to 85 percent m.

EXAMPLE XVIII

In a procedure similar to that of Example XVII, 15.6 grams gamma alumina containing $K_2O$, prepared according to the method of Example XIII, was rapidly added to a mixture of 27.8 grams MPN, 61.0 grams NE and 88 grams toluene. The mixture being heated to 40°C prior to the addition of catalyst. After 2 hours 96 percent of MPN had been converted.

After the catalyst had been filtered off, the reaction mixture was evaporated under vacuum. The mixture (43 grams) of syn- and anti-isomers (60/40) obtained as a residue was split up into two equal parts.

a. Isomerization of syn-isomer to anti-isomer

An amount of 21.5 grams of the mixture of syn- and anti-isomers was dissolved in toluene. After 1 gram toluenesulphonic acid had been added, it was allowed to stand for 20 hours at room temperature. It was subsequently filtered and the filtrate was evaporated under vacuum. The residue consisted substantially of the anti-isomer, which was isolated by extraction with pentane/toluene. A quantity of 20 grams was obtained.

b. Isomerization of anti-isomer to syn-isomer

An amount of 21.5 grams of the mixture of syn- and anti-isomers was dissolved in dioxane at 10°C and then dry HCl was introduced until saturation was reached. It was allowed to stand overnight, after which it was worked up in a way analogous to that of Example XVII. An amount of 19 grams of the syn-isomer was obtained.

EXAMPLE XIX

Using the procedure of Example XVIII, 8 grams catalyst prepared by impregnation of the gamma-$Al_2O_3$ with $K_2CO_3$, followed by drying and calcination at 580°C for 24 hours was added to a mixture of 27.7 grams MPN, 44.4 grams NE and 86.8 grams toluene, the mixture being heated to 40°C prior to the addition of the catalyst. After 6.5 hours at 32°C 93 percent MPN had been converted.

After working-up the product as in Example XVII, an amount of 29.6 grams syn-isomer and, from the filtrate, 11.1 grams anti-isomer was obtained.

The catalyst filtered off was then washed with 1,2-dimethoxyethane, dried for 2 hours at 200°C under vacuum and calcined at 580°C for 17 hours. When the experiment was repeated with the catalyst thus regenerated the same results were obtained.

EXAMPLE XX

The reaction of Example XIX was repeated using 28.6 grams MPN, 45.0 grams NE, 87.8 grams xylene and 12 grams catalyst. Amounts of 23 grams syn-isomer and 16.7 grams anti-isomer were obtained.

EXAMPLE XXI

The reaction of Example XIX was repeated using 56.1 grams MPN, 99.1 grams NE and 28 grams catalyst. After 4 hours 93 percent MPN had been converted.

After completion of the reaction the product was diluted with toluene and then worked up in the usual way. The amount of 83.6 grams product was obtained, from which 51.3 grams syn-isomer and 30.2 grams anti-isomer were isolated.

EXAMPLES XXII–XXVII

Table B contains the data for a number of experiments in which different starting materials were employed. The experiments were discontinued after the reaction times indicated, even if the reactions concerned had not yet been completed. The catalyst was gamma-$Al_2O_3$ with a $K_2O$ content of 150 mmole of $K_2O$ per 100 grams (=15.6 percent w), and had been prepared by impregnation of gamma-$Al_2O_3$ "SCS 350" (Pechiney) with $K_2CO_3$ in a way analogous to that described in Example XIX.

of the residue from toluene. An amount of 6.9 grams of exclusively the syn-isomer of the S-phenyl ester of thioacetohydroximic acid was obtained. Melting point 103°–105°C.

EXAMPLE XXIX

1-Octanethiol and nitroethane were reacted using a method analogous to Example XXVIII, but using 2 grams catalyst. Recrystallization from pentane of the residue obtained yielded 5.1 grams white leaflets of exclusively the syn-isomer of the S-(1-octyl) ester of thioacetohydroximic acid. Melting point 82°C.

EXAMPLE XXX

3-Mercaptopropiononitrile and 1-nitropropane were reacted using a method analogous to Example XXIX, but at 40°C. An amount of 6.8 grams product was obtained from which 4.4 grams syn-isomer (crystals) and 2.2 grams anti-isomer (oil) of the S-(2-cyanoethyl) ester of thiopropionohydroximic acid was isolated by recrystallization from pentane/toluene. The syn-isomer melted at 80°–82°C with simultaneous decomposition.

EXAMPLE XXXI 10.6 Grams 3-mercaptopropiononitrile and 16.9 grams nitromethane were reacted in 21.8 g toluene with 3 gram catalyst at room temperature using a method analogous to Example XXIX. Recrystallization of the product from 1,2-dichloroethane yielded 8 grams white needles of the syn-isomer of the S-(2-cyanoethyl) ester of thioformohydroximic acid. The syn-isomer melted at 102°–104°C with decomposition.

EXAMPLE XXXII

3 Grams 1,2-ethanedithiol and 10 grams nitroethane were reacted in 15 ml toluene at 40°C using a method analogous to Example XXXI. To be worked up the reaction mixture was diluted with DMC and — after the catalyst had been filtered off — evaporated. After the pasty residue formed had been extracted with chloroform, an amount of 2.5 grams white crystals of the syn-isomer (melting point of 104°C) was obtained by recrystallization of the residue from DMC and from the extract an amount of 1.8 grams white crystals of the an-

TABLE B

| Example | Nitro Compound A | Thiol B | A/B m/mole | Solvent | Temp. °C | Time, hr | Thiol Conversion, % |
|---|---|---|---|---|---|---|---|
| XXII | $C_2H_5NO_2$ | $C_6H_5SH$ | 3.3 | 1,2-dimethoxyethane | 20 | 2 | 100 |
| XXIII | $C_2H_5NO_2$ | $C_8H_{17}SH$ | 3.1 | do. | 20 | 24 | 85 |
| XXIV | $C_3H_7NO_2$ | $NO(CH_2)$—SH | 2.3 | do. | 40 | 6 | 90 |
| XXV | $CH_3NO_2$ | do. | 2.3 | toluene | 20 | 12 | 58 |
| XXVI | $C_2H_5NO_2$ | $HS(CH_2)_2SH$ | 4.3 | do. | 40 | 10 | 65 |
| XXVII | $C_2H_5NO_2$ | $HO(CH_2)$—SH | 2.0 | do. | 55 | 1 | 100 |

EXAMPLE XXVIII

An amount of 1.2 grams catalyst was added with stirring to a mixture of 4.8 grams benzenethiol, 10.9 grams nitroethane and 10 grams 1,2-dimethoxyethane (DMC) at room temperature without cooling. After the catalyst had been filtered off the product was worked up by evaporation under vacuum and recrystallization ti-isomer of the S-(2-mercaptoethyl) ester of thioacetohydroximic acid (decomposition above 160°C).

EXAMPLE XXXIII

2-Mercaptoethanol and nitroethane were reacted at 55°C using the method of Example XXXII. After evaporation under vacuum an amount of 12.2 grams viscous oil was obtained, which crystallized gradually. Treatment with DMC yielded 4.2 grams solid isomer (melting point 88°–89°C) and 8.0 grams liquid isomer of the S-(2-hydroxyethyl) ester of thioacetohydroximic acid.

EXAMPLE XXXIV

S-methyl ester of thioacetohydroximic acid

In a solution of 50 g nitroethane in 70 ml toluene 8 g catalyst was suspended while stirring and nitrogen was passed through. The catalyst was gamma-alumina with a $K_2O$ content of 150 mmole per 100 g (=15.6 percent w), prepared by impregnation of gamma-$Al_2O_3$ "SCS 350" (Pechiney) with $K_2CO_3$ as in Example IX. Subsequently 16 g methanethiol was introduced into the suspension in 1½ hours at 30°C, with continued stirring, after which the stirring was continued for another 4 hours at the same temperature.

After addition of "high-Flo" the mixture was filtered and the filtrate evaporated under vacuum at a temperature below 60°C. An amount of 21 g of a light-red-colored oil was obtained as a residue, which partly crystallized. An amount of 10 g of the syn-form of the S-methyl ester of thioacetohydroximic acid was obtained in the form of white needles by recrystallization from toluene/pentane (volume ratio 70/30), which needles melted at 82.9°C. The anti-form was separated from the mother liquor in the form of oil (9.5 g) by means of dilution with pentane. The total yield of syn and anti-isomers to 60 percent m.

EXAMPLE XXXV

S-methyl ester of thioacetohydroximic acid

A reaction vessel, provided with a suspension stirrer and with a reflux condenser cooled with dry ice, was charged with a mixture of 89 g (1.19 mole) nitroethane and 25.5 g (0.54 mole) methaneethiol cooled to 0°C, and with 20 g of catalyst as used in Example XXXIV while a stream of nitrogen was passed through the mixture. Under vigorous stirring in the nitrogen atmosphere, the mixture was heated to 40°C, kept at this temperature for 4 hours and subsequently at 50°C for 7 hours.

After consecutive treatment with gaseous $CO_2$ and addition of "High-Flo," the mixture was filtered. The filtrate, after evaporation of the volatile products at 40°C and 12 mm Hg, yielded 42 g of a yellow oil which partly crystallized. According to I.R. and N.M.R. spectra it consisted of a mixture of syn- and anti-isomers. Recrystallization from a toluene-pentane mixture gave while crystals (24 g) of the syn-isomer, melting point 82.9°C and a light yellow oil (18 g) consisting of 75 percent anti- and 25 percent syn-isomer.

The syn/anti ratio of the total product was 3:1. The conversion was 74 mol percent based on the methanethiol, and the selectivity greater than 90 percent.

EXAMPLE XXXVI

S-methyl ester of thioacetohydroximic acid

An autoclave was charged with a mixture of 150 g (2 mole) nitroethane, 31.5 g (0.65 mole) methanethiol and 27 g of catalyst as used in Example XXXIV, cooled to 0°C. The autoclave was purged with nitrogen before being closed. The mixture was then heated at 80°C for 27 hours with magnetically stirring.

After cooling to room temperature the mixture was treated with gaseous $CO_2$, whereupon "High-Flo" was added and the mixture was filtered. The filtrate, after evaporation of the volatile products at 40°C and 12 mm Hg, yielded 63.5 g of a dark brown oil, which on crystallization from a toluene-pentane mixture (1:1 v/v) gave 26 g of the syn-isomer. The filtrate was then evaporated at 40°C and 12 mm Hg, and the residue treated with pentane, the pentane extract being separated from the remaining tarry mass. Evaporation of the pentane yielded 24 g of an oil which consisted of 70 percent anti- and 30 percent syn-isomer.

The syn/anti ratio of the total product obtained was 2:1. The conversion was 93 mol percent based on the methanethiol, and the selectivity was about 80 percent.

We claim as our invention:

1. In the process for preparation of a thiohydroximic ester by reacting a thiol with a primary alkyl, aryl or aralkyl nitro compound wherein the nitro group is directly linked to a methylene group ($-CH_2-$), the improvement comprising conducting the reaction in the presence of solid, porous, particulate gamma-alumina with a pore volume of 0.3 to 1.0 ml./g. and a specific surface area of 50 to 400 m.²/g. as a catalyst for the reaction.

2. The process of claim 1 wherein the thiol compound is methanethiol or 3-mercaptopropionitrile and the primary nitro compound is nitroethane.

3. The process of claim 1 wherein the gamma-alumina containing catalyst is gamma-alumina with a pore volume of 0.3 to 0.6 milliliters per gram.

4. The process of claim 1 wherein the gamma-alumina containing catalyst is gamma-alumina with a specific surface area of 200 to 400 square meters per gram.

5. The process of claim 1 wherein the gamma-alumina catalyst is gamma-alumina containing per 100 grams of catalyst 120 to 200 millimoles of basic compound selected from the group consisting of alkali metal compound, alkaline earth metal compounds and mixtures thereof.

6. The process of claim 5 wherein the basic compound is an alkali metal oxide, hydroxide, or aluminate or a mixture thereof.

7. The process of claim 6 wherein the basic compound is potassium oxide, potassium hydroxide, or potassium aluminate or a mixture thereof.

* * * * *